C. H. HIGGINS.
VACCINATING NEEDLE.
APPLICATION FILED MAR. 14, 1908.
904,779.
Patented Nov. 24, 1908.
FIG. 1.
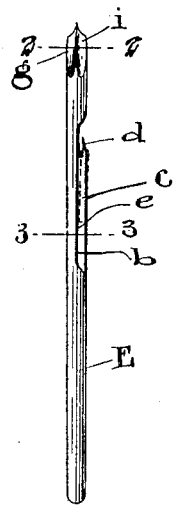
FIG. 3.
FIG. 7.
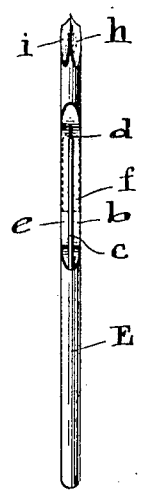
FIG. 4.
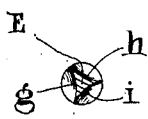
FIG. 5.
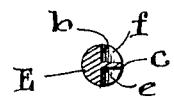
FIG. 6.
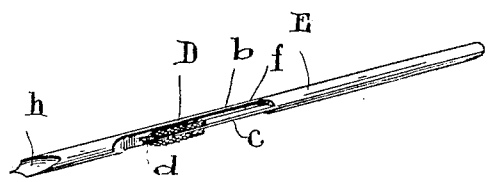
FIG. 2.
WITNESSES
Wm A Wyman
J. H. Lewis
INVENTOR
C. H. HIGGINS.
BY
J. B. Wheristonhaugh
ATT'Y.

UNITED STATES PATENT OFFICE.

CHARLES HERBERT HIGGINS, OF OTTAWA, ONTARIO, CANADA.

VACCINATING-NEEDLE.

No. 904,779.　　　Specification of Letters Patent.　　　Patented Nov. 24, 1908.

Application filed March 14, 1908. Serial No. 421,268.

*To all whom it may concern:*

Be it known that I, CHARLES HERBERT HIGGINS, of the city of Ottawa, in the county of Carleton, Province of Ontario, Dominion of Canada, have invented certain new and useful Improvements in Vaccinating - Needles, of which the following is a specification.

My invention relates to an improved needle for introducing vaccine or virus filaments, and the objects of my invention are to provide such means as will enable the impregnated filament or thread, containing the vaccine or virus, to be introduced without handling. The characteristic feature of the needle is a pointed hook on the side thereof, sufficiently sharp to enable its insertion through the braided thread or filament without the necessity of touching the filaments by the hands, all as hereinafter more fully set forth and described in the accompanying specifications and drawings.

In the drawings,—Figure 1 is a side view of one of the filaments. Fig. 2 is a perspective view of the needle and filament thereon. Fig. 3 is a side view of the needle. Fig. 4 is a front view of the needle. Fig. 5 is a sectional view of the needle along the line 2—2, Fig. 3. Fig. 6 is a sectional view along the line 3—3, Fig. 2. Fig. 7 is an enlarged sectional view of the hook on the needle.

In the drawings, like letters of reference indicate corresponding parts in each figure.

E represents the needle, which is formed, in accordance with my invention, with a longitudinal recess *b* along one side within which is a central rib *c*, the upper end of which is formed into a pointed hook *d*, the rib being of less width than the recess *b*, whereby grooves *e* and *f* will be formed on each side of the rib, into which the filament may fit, as shown. The point of the needle itself is formed with a plurality of concaved and converging faces *g*, *h* and *i* which greatly facilitate the insertion of the needle through the skin of the animal.

The filament D is formed of braided fabric and is impregnated in a wellknown manner with virus or vaccine, each filament containing a measured dose of the vaccine or virus just sufficient to effect one inoculation.

In introducing the filament, the pointed hook is engaged between the braids thereof and the needle inserted beneath the skin of the animal and withdrawn, leaving the impregnated filament beneath the skin or in the muscles of the animal.

It will be observed that it is important to have the filament constructed of braided fabric, as otherwise it would be difficult to engage the needle with it.

It will be observed that the degree of sharpness of the hook must be sufficient to enable it to be inserted between the strands of the braided filament or filament without the necessity of opening the strands or otherwise handling the filament. The difficulty with the old form of needle was that the thread being held only in the eye of the needle was liable to slip out of either side. In the present case, the sharp point inserted between the strands entirely prevents any relative movement between the needle and the filament.

What I claim as my invention is:

1. A needle for introducing vaccine or virus filaments comprising a pointed shank having a recess in one side of the same, and a hook on one side thereof lying wholly inwardly of the forward edge of the recess, the point of the hook being sufficiently sharp to enable the same to be inserted between the strands of a braided thread, without touching the same by hand.

2. A vaccinating needle, comprising a pointed shank, having a longitudinal recess in the side thereof, a central rib in the recess formed with a pointed hook at one end, and being of less width than the recess whereby grooves will be formed on each side into which a braided thread may take when engaged by the hook, the point of the hook being sufficiently sharp to enable the same to be inserted through the strands of the thread without the necessity of touching the same by hand.

In witness whereof I have hereunto set my hand in the presence of two witnesses.

CHARLES HERBERT HIGGINS.

Witnesses:
　RUSSEL S. SMART,
　CARMEL W. CAMERON.